(12) United States Patent
Navid

(10) Patent No.: US 8,497,659 B2
(45) Date of Patent: Jul. 30, 2013

(54) VIDEO GAME CONTROLLER CHARGING SYSTEM

(75) Inventor: Amir Navid, Sherman Oaks, CA (US)

(73) Assignee: Nyko Technologies, Inc., Los Angeles, CA (US)

( * ) Notice: Subject to any disclaimer, the term of this patent is extended or adjusted under 35 U.S.C. 154(b) by 519 days.

(21) Appl. No.: 12/729,526

(22) Filed: Mar. 23, 2010

(65) Prior Publication Data

US 2011/0234154 A1  Sep. 29, 2011

(51) Int. Cl.
*H02J 7/00* (2006.01)
*H01R 13/648* (2006.01)

(52) U.S. Cl.
USPC ........... 320/108; 320/109; 320/139; 320/140; 320/141; 439/101; 439/105; 703/25

(58) Field of Classification Search
USPC ........................................ 320/108
See application file for complete search history.

(56) References Cited

U.S. PATENT DOCUMENTS

| | | | | |
|---|---|---|---|---|
| 5,661,391 A | * | 8/1997 | Ito et al. | 320/108 |
| 5,903,764 A | * | 5/1999 | Shyr et al. | 713/300 |
| 6,061,261 A | * | 5/2000 | Chen et al. | 363/146 |
| 6,459,882 B1 | | 10/2002 | Palermo et al. | |
| D465,532 S | * | 11/2002 | Hussaini et al. | D21/333 |
| 6,509,717 B2 | * | 1/2003 | Lee | 320/116 |
| 7,151,357 B2 | | 12/2006 | Xian et al. | |
| 7,254,366 B2 | | 8/2007 | Palermo et al. | |
| 7,521,890 B2 | | 4/2009 | Lee et al. | |
| 7,535,195 B1 | * | 5/2009 | Horovitz et al. | 320/106 |
| D597,940 S | * | 8/2009 | Navid | D13/108 |
| 7,772,802 B2 | | 8/2010 | Manico et al. | |
| 7,775,884 B1 | | 8/2010 | McCauley | |
| 7,863,860 B2 | | 1/2011 | Lin | |
| 2007/0021209 A1 | * | 1/2007 | Hussaini et al. | 463/36 |
| 2007/0278998 A1 | * | 12/2007 | Koyama | 320/109 |
| 2008/0064500 A1 | | 3/2008 | Satsukawa et al. | |
| 2008/0150480 A1 | * | 6/2008 | Navid | 320/113 |
| 2009/0072782 A1 | | 3/2009 | Randall | |
| 2009/0072784 A1 | | 3/2009 | Erickson | |
| 2009/0096413 A1 | | 4/2009 | Partovi et al. | |
| 2009/0224723 A1 | | 9/2009 | Tanabe | |
| 2010/0001685 A1 | | 1/2010 | Eastlack | |
| 2010/0039066 A1 | | 2/2010 | Yuan et al. | |
| 2010/0244767 A1 | | 9/2010 | Turner et al. | |

OTHER PUBLICATIONS

Webpage of Engergizer 2X Induction Charge Station for Wii, Jan. 3, 2011, 6 pages.

* cited by examiner

*Primary Examiner* — Yalkew Fantu
(74) *Attorney, Agent, or Firm* — Christie, Parker & Hale, LLP

(57) ABSTRACT

A video game controller charging system for charging at least one video game controller is provided. The system includes a controller adapter including a battery unit, at least one first induction coil, and at least one first magnet, and is adapted to be received by the at least one video game controller; and a base including a power input, at least one second induction coil, and at least one structure on the base for providing physical support to the controller while the controller is being charged, the at least one structure including at least one second magnet. The base is configured to inductively charge the battery unit through inductive coupling between the at least one first induction coil and the at least one second induction coil when the controller is held in place on the structure by magnetic attraction between the magnets.

18 Claims, 10 Drawing Sheets

VIDEO GAME CONTROLLER CHARGING SYSTEM

FIELD OF THE INVENTION

Aspects of the present invention relate to charging systems for consumer electronics devices, and more particularly, to charging systems for hand-held controllers for video game consoles.

BACKGROUND

Consumer electronics devices ("CED"), such as personal computers, video game consoles, cell phones, and other devices, often utilize accessory devices that operate in connection with the CED. Examples of accessory devices include wireless headsets, audio speakers, and handheld controllers. These accessory devices often operate on battery power, so that they can be used without requiring a connection to a power supply. Frequent use of these battery-powered accessory devices drains the batteries and requires frequent replacement or recharging of the batteries Frequent replacement of batteries can be expensive, and as a result, many accessory devices utilize rechargeable batteries. The accessory device may be connected to a charging system periodically to recharge the batteries. The charging system and the accessory device have matching plugs or ports that fit together to make a connection. If the plug on the charging system or the accessory device is broken or damaged, the accessory device can no longer be connected to the charging system. These plugs can be small and/or fragile, as the accessory device itself is often a small, compact device. The user has to be careful to connect the plugs gently and completely to make a proper connection without damaging the parts. Further, accessory sleeves or wrist bands may have to be removed prior to charging.

Aspects of the present invention relate to charging systems for consumer electronics devices, and more particularly, to charging systems for hand-held controllers for video game consoles.

An embodiment of the present invention provides a video game controller charging system for charging at least one video game controller, the video game controller charging system including: a controller adapter including a battery unit, at least one first induction coil, and at least one first magnet, and adapted to be received by the at least one video game controller; and a base including a power input for connection to a power supply, at least one second induction coil, and at least one structure on the base for providing physical support to the at least one video game controller while the at least one video game controller is being charged, the at least one structure including at least one second magnet, wherein the base is configured to inductively charge the battery unit through inductive coupling between the at least one first induction coil and the at least one second induction coil when the at least one video game controller is held in place on the at least one structure by magnetic attraction between the at least one first magnet and the at least one second magnet.

SUMMARY

Aspects of the present invention relate to charging systems for consumer electronics devices, and more particularly, to charging systems for hand-held controllers for video game consoles.

An embodiment of the present invention provides a video game controller charging system for charging at least one video game controller, the video game controller charging system including: a controller adapter including a battery unit, at least one first induction coil, and at least one first magnet, and adapted to be received by the at least one video game controller; and a base including a power input for connection to a power supply, at least one second induction coil, and at least one structure on the base for providing physical support to the at least one video game controller while the at least one video game controller is being charged, the at least one structure including at least one second magnet, wherein the base is configured to inductively charge the battery unit through inductive coupling between the at least one first induction coil and the at least one second induction coil when the at least one video game controller is held in place on the at least one structure by magnetic attraction between the at least one first magnet and the at least one second magnet. The video game controller charging system may further include a charge sensor coupled to the battery unit and adapted to determine a charge status, and an indicator coupled to the charge sensor to indicate the charge status of the battery unit. The indicator may include at least one LED.

The at least one LED may include at least a first LED and a second LED, and when the charge status of the battery unit is charging, the first LED may emit a first color, and when the charge status of the battery unit is fully charged, the second LED may emit a second color.

The controller adapter may have a substantially similar outer profile to a battery cover plate provided with the video game controller.

The base may further include a USB port adapted to transfer power to another device.

The power input may include a power cord configured to couple to an AC power supply and an AC/DC converter. An AC power may be provided to the second induction coil.

The power input may include a USB port configured to couple to a consumer electronics device.

The structure on the base may include at least one docking bay, each configured to receive one of the at least one video game controllers.

The structure on the base may include two docking bays, each configured to receive one of the at least one video game controllers.

The video game controller charging system may further include an AC-to-DC converter adapted to convert externally supplied power to a DC power.

The AC-to-DC converter may be external to the base.

The AC-to-DC converter may be adapted to convert an AC voltage in the range of 100V to 240V corresponding to the externally supplied power into a DC voltage. The DC voltage may be DC 5V.

The controller adapter may further include a charge sensor configured to determine a charge status of the battery unit and an infrared emitter configured to transmit a signal to the base according to the charge status, and the base may further include an infrared receiver configured to receive the signal transmitted by the infrared emitter.

When the charge sensor determines that charge status of the battery unit is fully charge, the infrared emitter may transmit a signal to the infrared receiver on the base that instructs the base to stop charging the battery unit.

The controller adapter may further include a charge sensor configured to determine a charge status of the battery unit and an infrared emitter configured to transmit a signal to the base according to the charge status, the base may further include an infrared receiver configured to receive the signal transmitted by the infrared emitter, and the at least one first magnet and the at least one second magnet may be positioned so that the infrared emitter is aligned with the infrared receiver when the controller adapter is attached to the base.

DETAILED DESCRIPTION

An embodiment of the present invention relates to a charging system for a consumer electronics device (CED), and more particularly, to a charging station for one or more hand-held controllers for a video game console. The video game controller charging system includes a base, at least one structure on the base for providing physical support to at least one video game controller during and after charging, and at least one induction coil on the base configured to provide AC power to at least one induction coil on a controller adapter configured to attach to each controller. Through such inductive coupling, the video game controller (e.g., the controller adapter or battery) is charged.

In embodiments of the present invention, the video game controller charging system may include a charge sensor for detecting a charge status, a charge status indicator, at least one docking bay, an AC-to-DC converter adapted to convert externally supplied AC power to the DC power provided to charge the controller adapter attached to the controller, and/or a DC-to-AC converter for driving the induction coil. In some embodiments, the at least one docking bay of the charging system may include a receptacle having a base induction coil and being dimensioned to receive the controller so that a controller adapter induction coil is aligned with the base induction coil when the controller adapter is received by the receptacle. The charging system may also include magnets in the controller adapter and in the docking bays to attach the controller to the base for charging. The charging system may also include an external adapter with a connector configured to couple to a power input of an accessory device.

Figure 1:
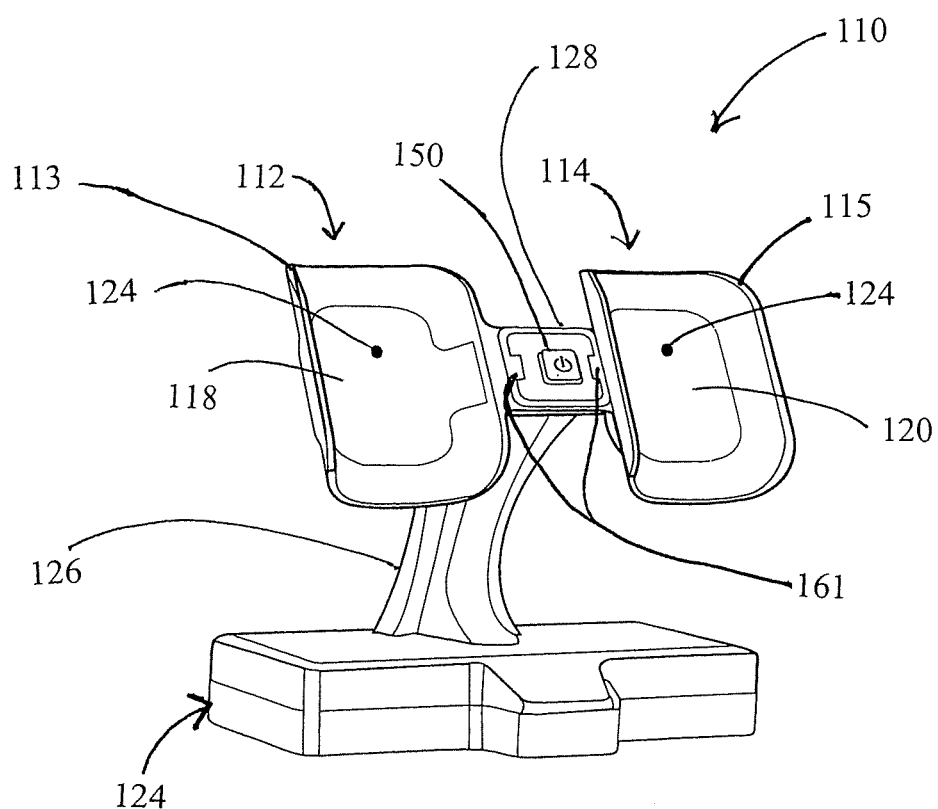
FIG. 1 is a perspective view of a base of a charging system according to an embodiment of the present invention.
Figure 8:
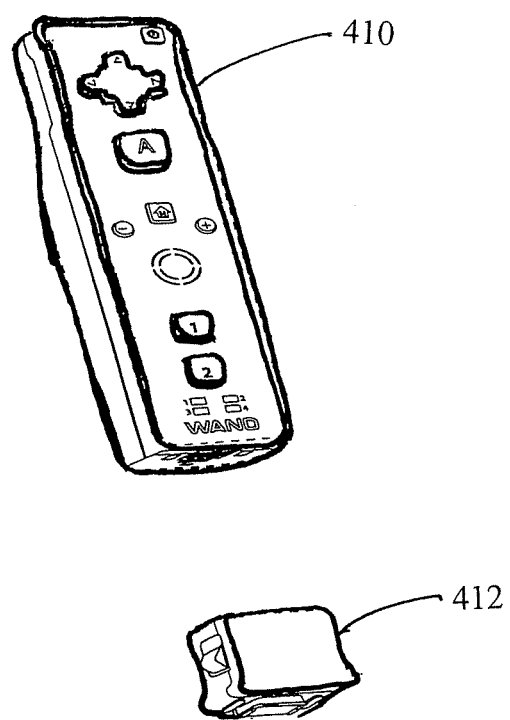
FIG. 8 is a perspective view of an exemplary video game controller.

A charging system according to an embodiment of the present invention is shown in FIG. 1. The charging system includes a base 110 with a foot 124, a riser 126 attached to the foot 124, and a bridge 128, which includes a power button 150 for powering the unit on and off and an indicator light 161 on each side of the power button 150. First and second docking bays 112, 114 are connected to each side of the bridge, respectively. Each docking bay 112, 114 is dimensioned to accept a controller 410 (see FIGS. 8 and 10) or other accessory device, which in one embodiment is a hand-held controller for a video game console, such as the Wii Remote® for the Nintendo Wii®, the Nyko® Wand, or the Nyko® Wand Plus.

Figure 2:
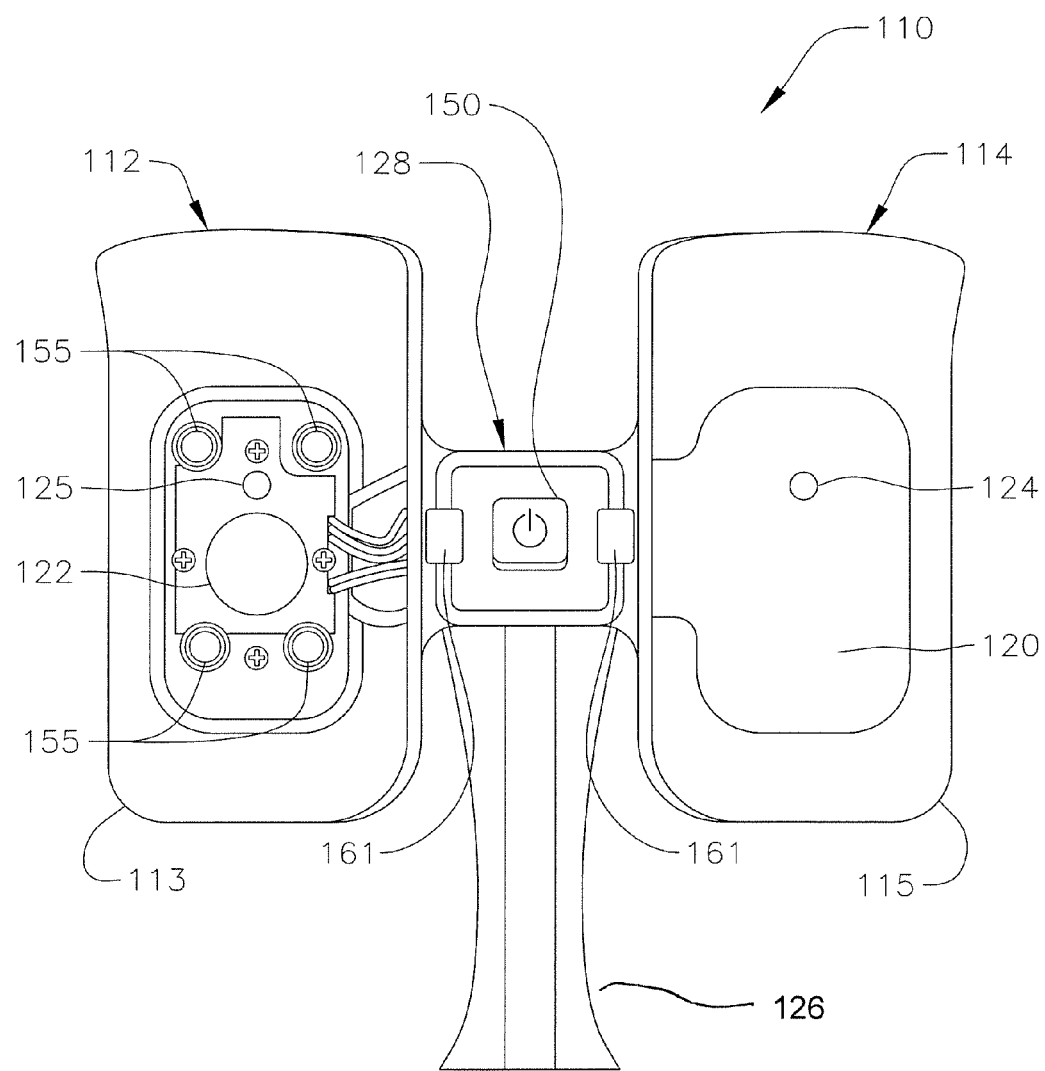
FIG. 2 is a partial perspective view of the base of the charging system of FIG. 1 with a cover plate removed.

The first and second docking bays 112, 114 include first and second receptacles 113, 115 about first and second cover plates 118, 120, respectively. A window 124 is located in each of the cover plates 118, 120. FIG. 2 shows the first docking bay 112 with the first cover plate 118 removed. Here, four base magnets 155, an infrared (IR) receiver 125, and a base induction coil 122 are located under each of the cover plates 118, 120. Though four base magnets 155 are shown, embodiments of the present invention may have more magnets or fewer magnets.

Also, in other embodiments, an IR transceiver, instead of an infrared receiver, may be used for bi-directional communication.

A controller that is powered with batteries typically has a removable plate (e.g., a battery compartment cover plate) provided with the controller that is removed from the controller to access the battery compartment. Here, the plate is removed from the back of the controller so that discharged disposable or rechargeable batteries can be replaced. Charged batteries can be inserted into the controller to contact electrical contacts in the controller to provide power to the controller. The plate may then be replaced onto the controller to cover the batteries.

Figure 3:
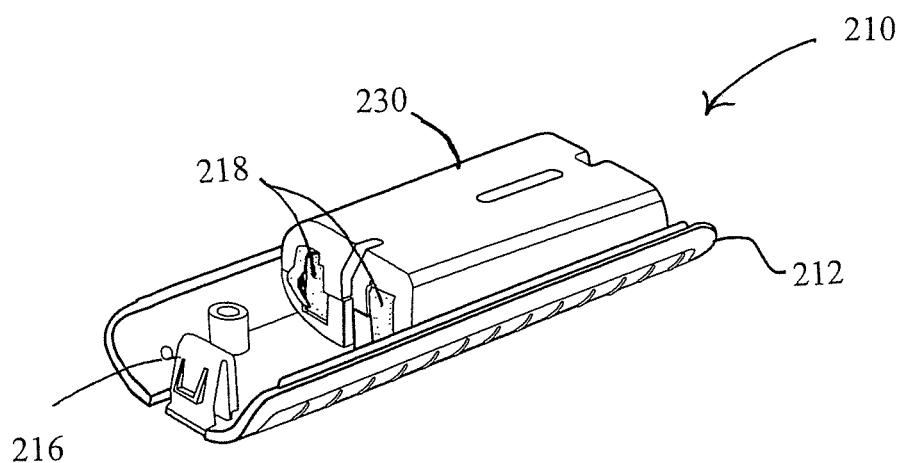
FIG. 3 is a perspective view of a controller adapter according to an embodiment of the present invention.
Figure 4:
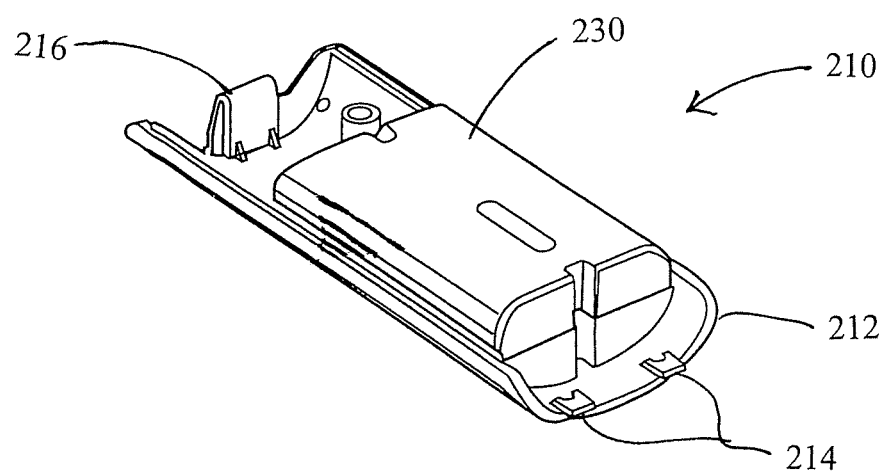
FIG. 4 is another perspective view of the controller adapter of FIG. 3.
Figure 7:
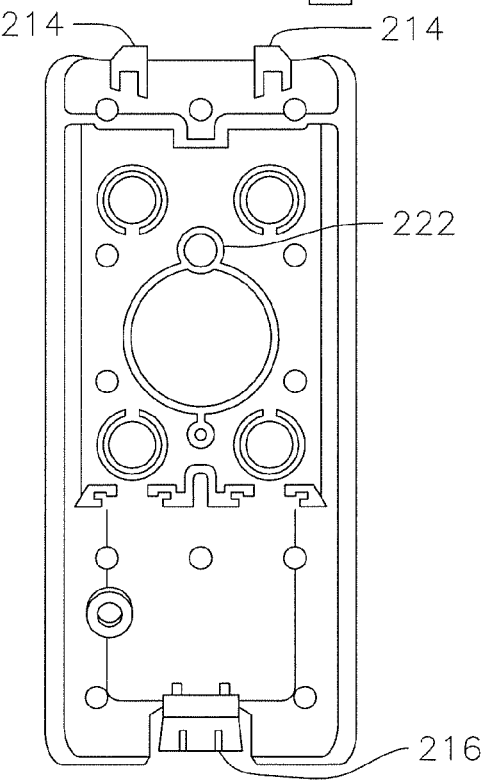
FIG. 7 is a front view of an adapter plate according to an embodiment of the present invention.

FIGS. 3 and 4 show perspective views of a controller adapter 210 (or battery pack) of a charging system according to an embodiment of the present invention. The controller adapter 210 includes an adapter plate 212 with two tabs 214 at one end of the adapter plate 212 and a spring clip 216 at the opposite end of the adapter plate 212. The adapter plate 212 is configured to attach to the controller 410 (e.g., see FIG. 8) in the place of the plate that is provided with the controller 410. Here, the tabs 214 slide into openings at the top of the battery compartment on the back of the controller 410 and the spring clip 216 is snapped into a slot at the bottom of the battery compartment so that the controller adapter 210 is attached to the controller 410. Further, the adapter plate 212 is configured so that the controller 410 will have the same outer profile with the adapter plate 212 attached as the controller 410 does with the provided plate attached. As shown in FIG. 7, the adapter plate 212 further includes an emitter window 222, which may be an opening or an IR-transparent material.

In an embodiment of the present invention, the exterior surface of the adapter plate 212 may have a texture applied, such as a rubberized cover, to improve the user's grip on the controller 410.

The controller adapter 210 further includes a battery unit 230 with two electrical leads 218. When the controller adapter 210 is attached to the controller 410, the electrical leads 218 of the battery unit 230 contact the electrical contacts in the controller 410 to provide power to the controller 410, instead of disposable or other rechargeable batteries.

Figure 5:
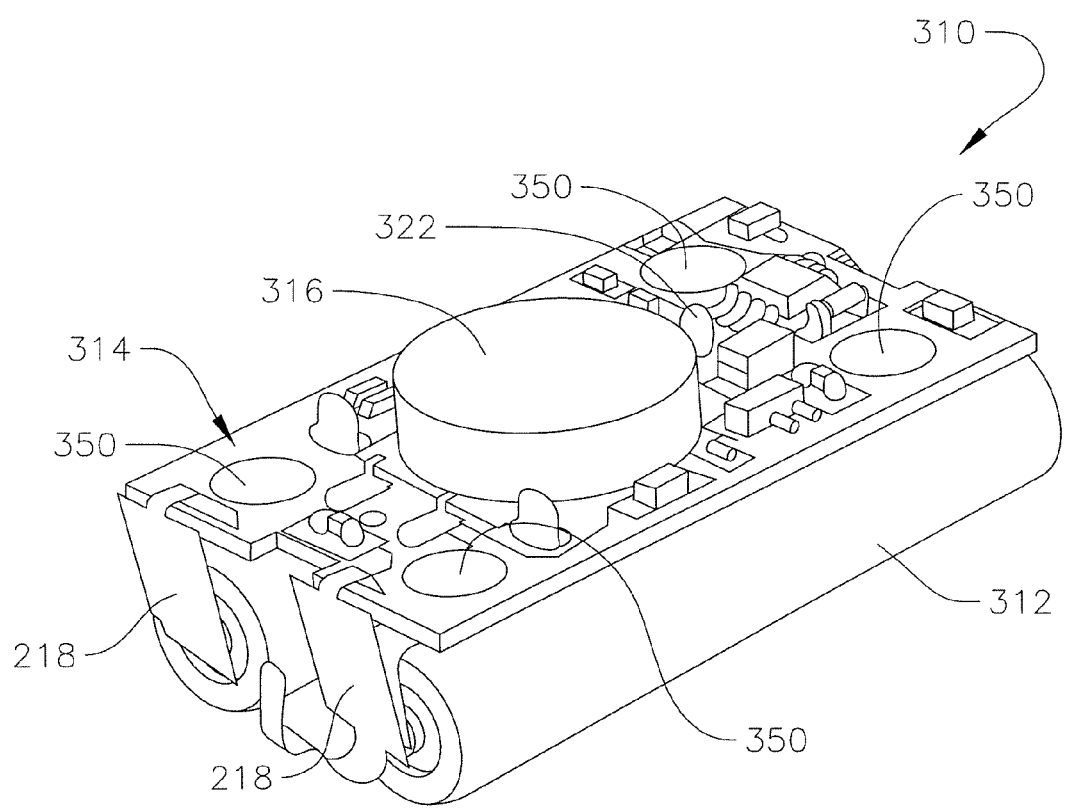
FIG. 5 is a perspective view of a battery unit according to an embodiment of the present invention.
Figure 6:
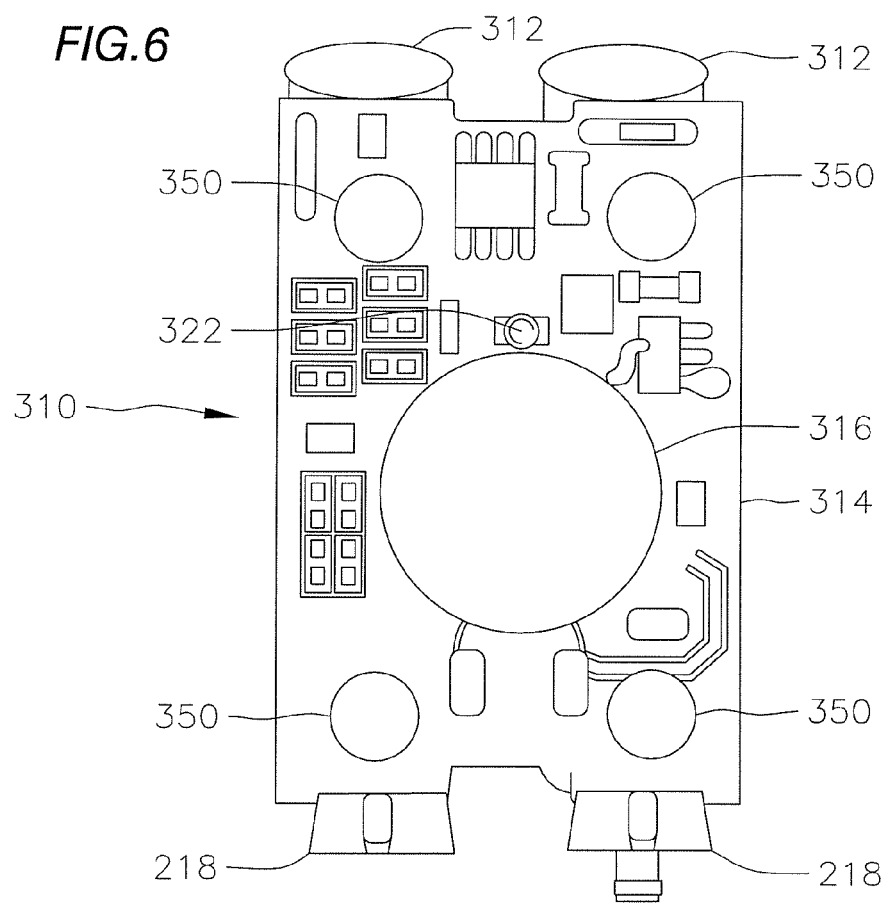
FIG. 6 is another perspective view of the battery unit of FIG. 5.

FIGS. 5 and 6 show a battery assembly 310 which is located inside the battery unit 230. The battery assembly 310 includes at least one rechargeable battery 312 (e.g., two batteries are shown) and a circuit board 314 with an infrared (IR) emitter 322 positioned to transmit IR signals through the emitter window 222 in the adapter plate 212, an adapter induction coil 316, and four adapter magnets 350. For example, the IR emitter 322 may be aligned with the emitter window 222. Although four adapter magnets are shown, embodiments of the present invention may have more magnets or fewer magnets. In other embodiments, an IR transceiver, instead of an IR emitter, may be used to receive IR signals from the base in addition to transmitting signals.

In an embodiment of the present invention, the at least one rechargeable battery is a lithium ion battery, a lithium polymer battery, a nickel metal hydride (NiMH) battery, or a NiCd battery.

Figure 10:
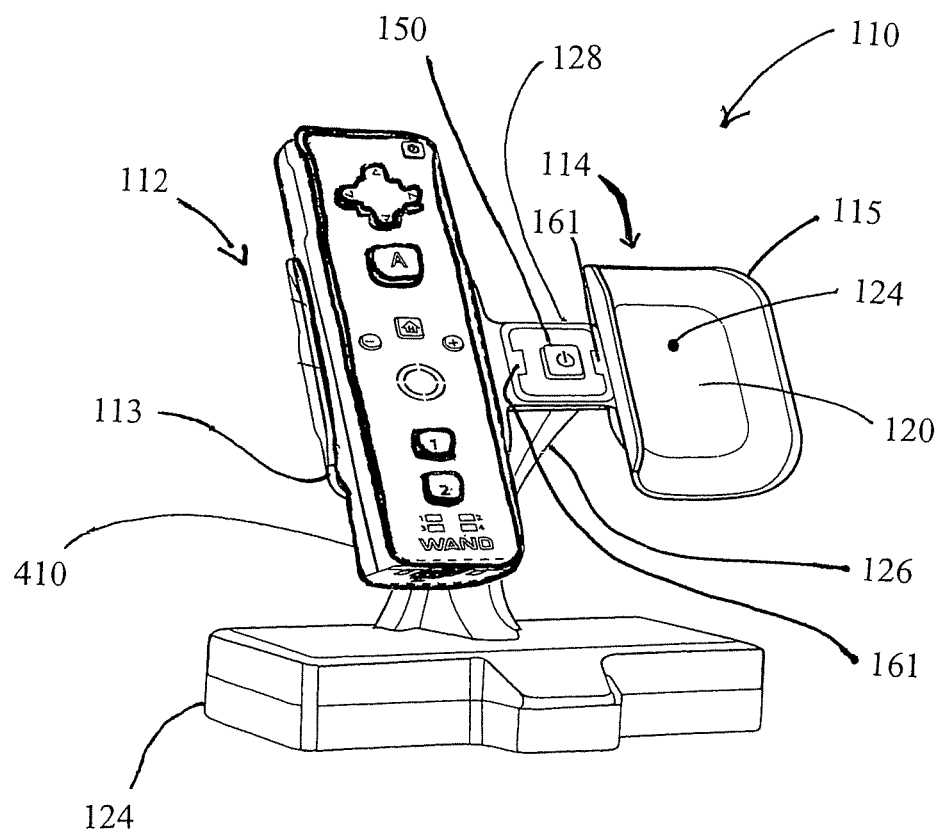
FIG. 10 is a perspective view of the charging system of FIG. 1 with an exemplary video game controller and an accessory.

In an embodiment of the present invention, the controller 410 drop-fits easily into the docking bays 112, 114, thus providing a fast and easy coupling of the controller adapters 210 to the charging system 110. The docking bays 112, 114 are dimensioned to receive the controller 410 with the controller adapter 210 attached into each docking bay 112, 114 with a drop-fit. As shown in FIGS. 1 and 10, the controller 410 may be positioned generally vertically into a receptacle 113 or 115 of the docking bay 112 or 114, where curved sides of the receptacle 113 or 115 guide the controller 410 into a desired position. When the controller 410 is placed into the docking bay 112 or 114, at least one base magnet 155 in the docking bay 112 or 114 attracts at least one adapter magnet 350 in the controller adapters 210 to correctly position and hold the controller 410 in the docking bay 112 or 114.

Though one controller shape and size is shown, in other embodiments of the present invention, the controller may have other shapes or sizes.

In an embodiment of the present invention, the magnets 155, 350 hold the controller 410 in a desired position with respect to the docking bay 112 or 114, so that the adapter induction coil 316 and the base induction coil 122 are aligned with each other.

In an embodiment of the present invention, the magnets 155, 350 additionally hold the controller 410 in a desired position with respect to the docking bay 112 or 114, so that the emitter window 222 and the window 124 in the cover plate 118 or 120 are aligned with each other.

In other embodiments, the docking bays 112, 114 and controller adapters 210 may have any suitable shape that allows the controller 410 to be correctly positioned in one of the docking bays 112 or 114. Thus, many molded configurations, including ridges, grooves, and other shapes, can be used to enable the docking bays 112, 114 to receive the controller 410. These examples are illustrative only, and not limiting.

In one embodiment, the receptacles 113, 115 have a top lip that mates with a groove on the controller 410 such that the controller 410 may only be placed into the docking bay 112 or 114 in one orientation.

While the embodiments described above use an almost vertical orientation for each of the controllers in the docking bays, other orientations may be used as well. In another embodiment, for example, the controllers may be received horizontally into one of the docking bays. In one embodiment, the controller is placed into the docking bay by a push-fit, press-fit, or snap-fit, rather than simply a drop-fit. These fitting engagements are fast and easy to use, and also provide a reliable connection between the remote and the base. In another embodiment, the charging system includes prongs that hold the controller in place (vertically or horizontally) in the docking bay to obtain effective charging.

The power adapter for the charging system may be a power cord that has an AC plug for connecting to an AC power supply or a DC power supply. In an embodiment, the charging system also includes an AC-to-DC converter. The power cord may be removably coupled to the base, or may be fixedly coupled to the base.

In embodiments of the present invention, the AC-to-DC converter may be located either in the AC plug or in the base.

When the charging system is in use, the AC plug is plugged into an AC outlet. In an embodiment of the present invention, the power adapter may take an input of 100V to 240 V (with frequencies of 50 Hz or 60 Hz) AC power and/or any other standard AC outlet voltage to enable the power adapter to be used in a number of different countries throughout the world. In the United States, AC voltage is standardized at 120V, but in practice, voltages range from 105 V to 130 V. In other parts of the world, voltages range from 100V to 240 V. The frequencies vary across the world as well. Though 60 Hz is standard in the U.S., in other parts of the world, AC voltage is supplied at 50 Hz or 60 Hz. The AC-to-DC power converters in the power adapter may be adapted to convert AC voltages from a particular standard to a DC voltage (e.g., 5V) required by the charging system.

While the AC plug of the power adapter may be a pair of parallel flat bars that are commonly used in the United States and some other countries, for international use, the AC plug may have a shape of a pair of cylindrical bars used in many Asian and European countries, and/or any other suitable shape. Furthermore, a single power adapter may include a number of different types of AC plugs for use in many different countries having different AC plug types.

In another embodiment of the present invention, the charging system may include one or more USB ports, or other types of ports, to which other CEDs with corresponding adapters may also be connected for charging.

In an alternative embodiment, the power input may be a USB port that connects to a CED (e.g., a video game console). The charging system provides this DC power to the controllers. In another embodiment, DC power may be provided as input to the charging system, where the DC power may be provided by an external AC-to-DC converter.

In another embodiment, the base 110 includes an AC/DC converter for converting input AC power to DC power for charging the controller. For example, the AC/DC converter may be located in the foot 124 of the base, or in any other suitable location. In other embodiments, the charging system may be provided with DC power via a mini-USB port or any other suitable DC power supply.

In another embodiment of the present invention, a DC-to-AC converter is located in the base for energizing the base induction coil 122.

Once the controller 410 is correctly positioned in one of the docking bays 112 or 114, the adapter induction coil 316 is aligned with the base induction coil 122 so that power can be transferred by inductive charging.

Here, for the inductive charging, power provided by the power adapter to the base 110 is used to create an electrical current (e.g., AC) in the base induction coil 122. In an embodiment of the present invention, the charging system converts the power from the AC outlet (e.g., a standard power) with a first voltage and a first frequency to a second voltage and a second frequency that is suitable for charging the batteries 312.

The current in the base induction coil 122 creates an electromagnetic field. Even though there may be a small gap between the base induction coil 122 and the adapter induction coil 316, energy is transferred from the base 110 to the controller adapter 210 because the electromagnetic field induces an electrical current in the adapter induction coil 316, which is then used to charge the batteries 312. Here, the two induction coils 122, 316 in proximity are combined to form an electrical transformer.

Inductive charging carries a far lower risk of electrical shock, when compared with conductive charging, because there are no exposed conductors. Further, inductive charging also makes charging the controller 410 more convenient, because rather than having to connect a power cable or ensure that electrical contacts connect, the controller 410 may simply be dropped into the charging system.

Also, the charging system may charge two controllers 410 simultaneously (or concurrently), or the charging system may charge one controller 410 at a time. However, one of ordinary skill in the art will appreciate that the charging system may be configured to charge more than two controllers at a time.

Figure 12:
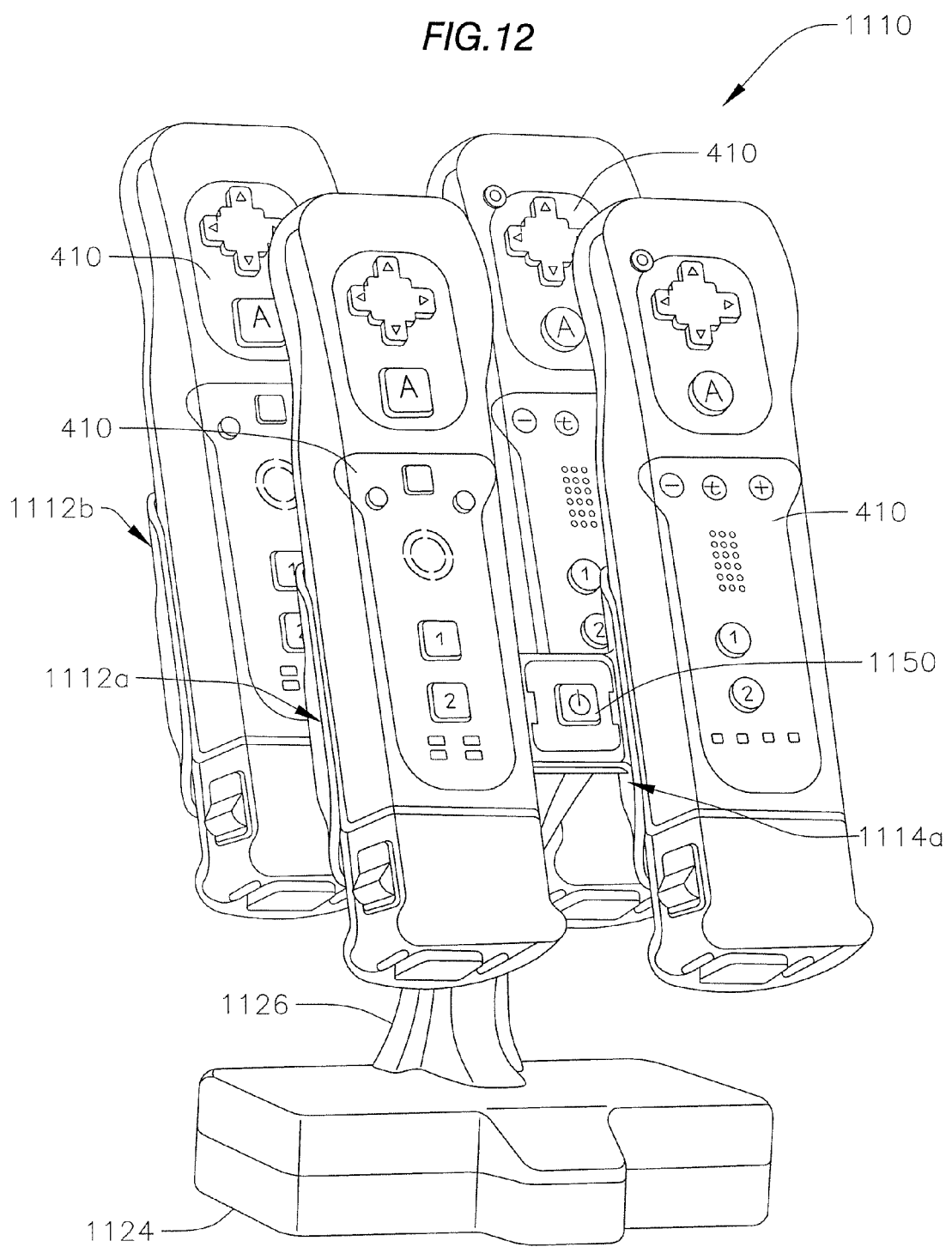
FIG. 12 is a perspective view of a base of a charging system according to another embodiment of the present invention.

For example, as shown in FIG. 12, the charging system has a base 1110 with four docking bays 1112a, 1112b, 1114a, and 1114b attached to a riser 1126 attached to a foot 1124. Here, the docking bays 1112a, 1112b, 1114a, and 1114b are arranged in two rows. However, the docking bays may be arranged in any suitable arrangement, such as one row.

In an embodiment of the present invention, a companion device, such as a Wii Motion Plus® 412 (shown in FIG. 8), may remain attached to the controller 410, such as the Wii Remote®, and does not need to be removed for the controller 410 to be positioned in one of the docking bays 112, 114.

Figure 9:
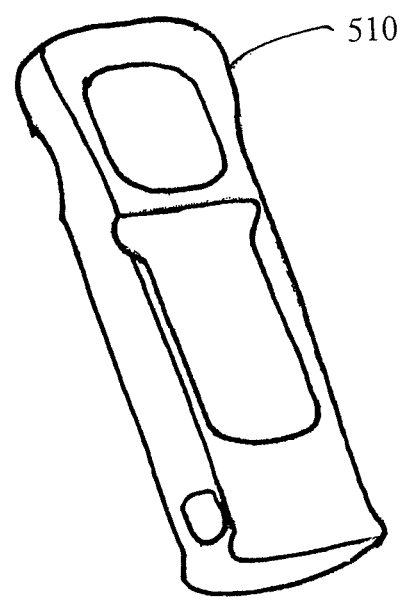
FIG. 9 is a perspective view of an exemplary video game controller sleeve.

Additionally, an optional sleeve 510 that may be positioned about the controller 410 for protection and improved gripping, shown in FIG. 9, does not need to be removed for charging. However, since the speed of induction charging is related to a distance between the coils, charging of the controller 410 may be slower with the sleeve 510 on the controller 410. In another example, the sleeve may be made of silicone and/or may also cover a companion device. Further, an optional wrist strap connected to the bottom of the controller 410 also need not be removed for charging.

In one embodiment, the charging system includes a charge sensor, such as charge sensor circuitry, in the battery unit 310, which is configured to determine the charge status of the batteries 312. For example, the charge sensor may detect the amount of current being provided by the power adapter to the batteries 312 through the coils 122, 316. Here, if sufficient current (e.g., a predetermined amount of current) is detected by the charge sensor, the charge status of the batteries 312 is not fully charged, so the batteries 312 to continue to be charged.

However, when the charging has been completed, less current is detected because the batteries 312 are already substantially fully charged. Here, the charge sensor instructs the IR emitter 322 in the battery assembly 310 to emit a signal that is transmitted through the emitter window 222 and the window 124 in the cover plate 118 or 120 so that it is received by the IR receiver 125. The signal indicates to the base 110 that the batteries 312 are fully charged so that charging is stopped.

However, in other embodiments, the IR emitter 322 may send different types of signals, such as signals that indicate that charging should be continued or slowed.

Further, one of ordinary skill in the art will appreciate that charge sensor may communicate with the base 110 via any other suitable method, such as WiFi.

In an embodiment of the present invention, the charging system may also include an indicator 161 that indicates a charge status of the charging system to the user. The indicator 161 receives information from the base 110 regarding the charge status of the charging system. In an embodiment shown in FIG. 1, the indicator 161 includes an LED assembly for each docking bay 112 and 114 that indicates the charge status of the controller 410 being charged in the respective docking bay. Each of the LED assemblies includes at least two LEDs having different colors. By way of example, each of the LED assemblies may include a green LED and a blue LED. While the respective controller 410 is being charged, the blue LED is emitted to indicate that the controller 410 (i.e., the batteries inside the controller 410) is currently being charged. Further, when the respective controller 410 is finished charging, the green LED is emitted to indicate that the charging has been completed. In other embodiments, each of the LED assemblies may include different color LEDs and/or different numbers (e.g., three) of LEDs to indicate charge status.

In another embodiment of the present invention, the green LED may be emitted when no controller is positioned in the docking bay 112 or 114, which makes it easier for a user to find and position a controller 410 in the empty docking bay 112 or 114 in a darkened room, and is also visually pleasing.

In still other embodiments, each of the LED assemblies may include a single LED.

In another embodiment of the present invention, the receptacles 113, 115 of the docking bays 112, 114 are formed of a transparent material, such as plastic or acrylic. Further, when the LEDs described above are emitted, the light emitted by the LEDs may travel through the receptacles 113, 115 so that the receptacles 113, 115 or the edges of the receptacles 113, 115 are also illuminated with light from the LEDs. Here, the effect may be visually pleasing, may make it easier for the user to determine the charge state of the batteries 312 in the controller 410, and may make it easier for the user to locate the controller 410 or the base 110 in a darkened room.

Figure 11:
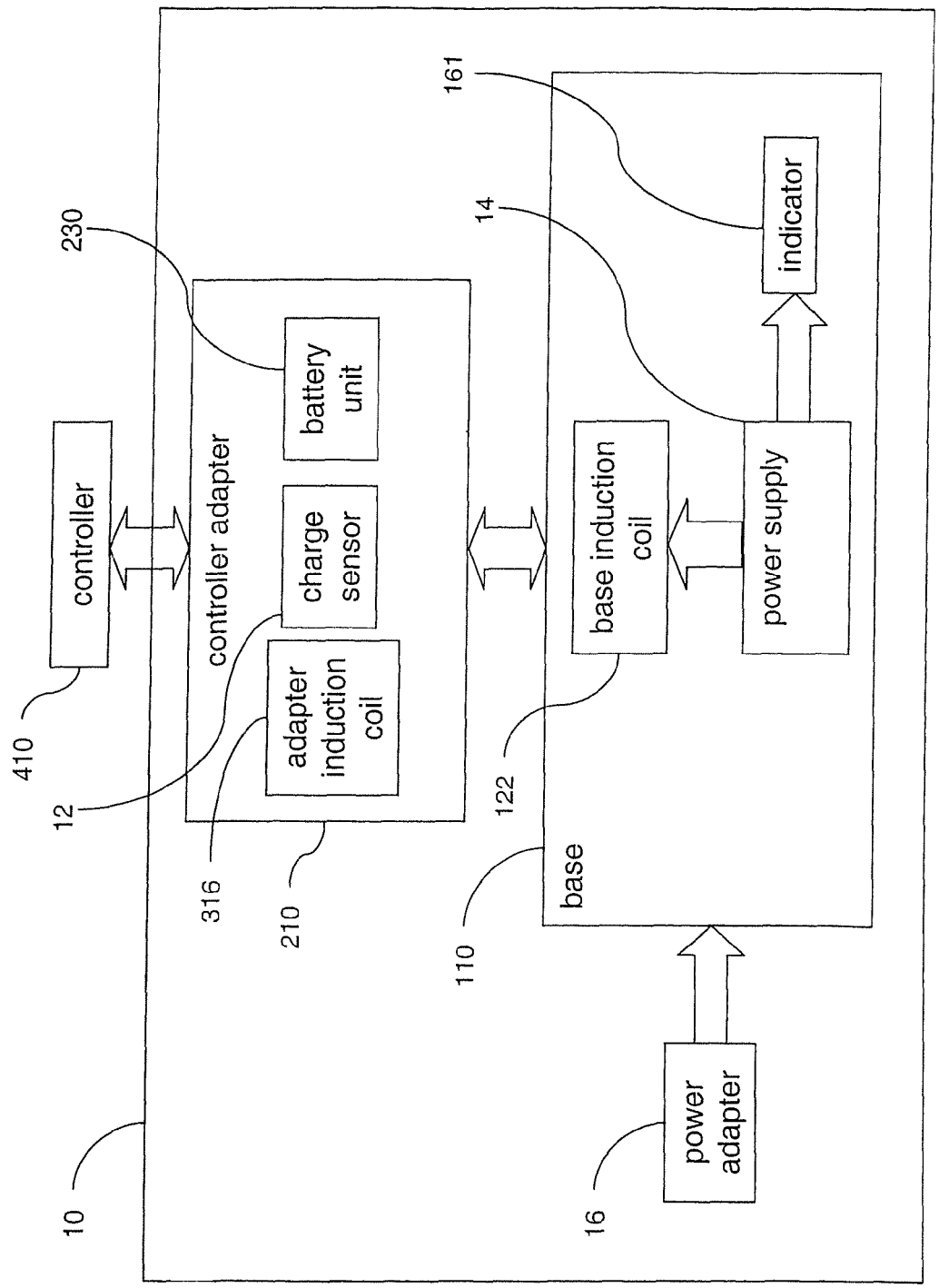
FIG. 11 is a block diagram of a charging system and an exemplary video game controller according to an embodiment of the present invention.

A block diagram of the charging system 10 according to an embodiment of the present invention is shown in FIG. 11, showing some of the above-described components of the charging system 10 in schematic form. As can be seen in FIG. 11, the charging system 10 includes at least one controller adapter 210 that is adapted to be electrically coupled with the controller 410. The controller adapter 210 includes an adapter induction coil 316, a battery unit 230, and a charge sensor 12. Power is supplied to the base 110 by a power adapter 16. The power supply 14 in the base receives power from the power adapter 16 and supplies power to the base induction coil 122 and at least one indicator 161. The base induction coil 122 transfers power to the adapter induction coil 316 via inductive charging. The charge sensor 12 determines when the battery unit 230 is fully charged and transmits a signal to the base 110 instructing the base 110 to stop charging. The indicator 410 indicates a charge state of the battery unit 230, for example, by emitting a first color when the battery unit 230 is being charged and emitting a second color when the battery unit 230 is fully charged.

In an embodiment of the present invention, the controller adapter 210 is a small and light-weight piece that connects snugly to the controller 410 and does not interfere with operation of the controller 26. When the controller 410 needs to be recharged, connecting it to the charging system is as easy as dropping it into one of the docking bays 112, 114. The charging system is connected to a power supply through its own power adapter. The charging system then provides power to the controller 410 to recharge the batteries 312, which is reliably achieved by induction charging from the base 110. This recharging process is fast and easy, as the controller adapter 210 allows the controller to be simply dropped into place, rather than carefully connected to a fragile port or connector.

While the CED is described in the above embodiments as a video game console, and the accessory device is described as a hand-held controller for the video game console, the invention may be used for other CEDs and accessory devices, such as cell phones, wireless headsets, personal computers and related peripheral devices, and many other electronic devices. This list is meant to be illustrative only, and not limiting.

It will be appreciated by those with ordinary skill in the art that that invention can be embodied in other specific forms without departing from the spirit or essential character thereof. The embodiments described above should be considered to be illustrative and not restrictive. The scope of the present invention is defined by the appended claims and their equivalents

What is claimed is:

1. A video game controller charging system for charging at least one video game controller, the video game controller charging system comprising:
   a controller adapter comprising a battery unit, at least one first induction coil, and at least one first magnet, and adapted to be received by the at least one video game controller; and
   a base comprising a power input for connection to a power supply, at least one second induction coil, and at least one structure on the base for providing physical support to the at least one video game controller while the at least one video game controller is being charged, the at least one structure comprising at least one second magnet,
   wherein the base is configured to inductively charge the battery unit through inductive coupling between the at least one first induction coil and the at least one second induction coil when the at least one video game controller is held in place on the at least one structure by magnetic attraction between the at least one first magnet and the at least one second magnet.

2. The video game controller charging system of claim 1, further comprising a charge sensor coupled to the battery unit and adapted to determine a charge status, and an indicator coupled to the charge sensor to indicate the charge status of the battery unit.

3. The video game controller charging system of claim 2, wherein the indicator comprises at least one LED.

4. The video game controller charging system of claim 3, wherein the at least one LED comprises at least a first LED and a second LED; and wherein when the charge status of the battery unit is charging, the first LED emits a first color, and when the charge status of the battery unit is fully charged, the second LED emits a second color.

5. The video game controller charging system of claim 1, wherein the controller adapter has a substantially similar outer profile to a battery cover plate provided with the video game controller.

6. The video game controller charging system of claim 1, wherein the base further comprises a USB port adapted to transfer power to another device.

7. The video game controller charging system of claim 1, wherein the power input comprises a power cord configured to couple to an AC power supply and an AC-to-DC converter.

8. The video game controller charging system of claim 1, wherein an AC power is provided to the second induction coil.

9. The video game controller charging system of claim 1, wherein the power input comprises a USB port configured to couple to a consumer electronics device.

10. The video game controller charging system of claim 1, wherein the structure on the base comprises at least one docking bay, each configured to receive one of the at least one video game controllers.

11. The video game controller charging system of claim 1, where the structure on the base comprises two docking bays, each configured to receive one of the at least one video game controllers.

12. The video game controller charging system of claim 1, further comprising an AC-to-DC converter adapted to convert externally supplied power to a DC power.

13. The video game controller charging system of claim 12, wherein the AC-to-DC converter is external to the base.

14. The video game controller charging system of claim 12, wherein the AC-to-DC converter is adapted to convert an AC voltage in the range of 100V to 240 V corresponding to the externally supplied power into a DC voltage.

15. The video game controller charging system of claim 14, wherein the DC voltage is DC 5V.

16. The video game controller charging system of claim 1, wherein the controller adapter further comprises a charge sensor configured to determine a charge status of the battery unit and an infrared emitter configured to transmit a signal to the base according to the charge status, and wherein the base further comprises an infrared receiver configured to receive the signal transmitted by the infrared emitter.

17. The video game controller charging system of claim 16, wherein when the charge sensor determines that the charge status of the battery unit is fully charge, the infrared emitter transmits the signal to the infrared receiver on the base to instruct the base to stop charging the battery unit.

18. The video game controller charging system of claim 1, wherein the controller adapter further comprises a charge sensor configured to determine a charge status of the battery unit and an infrared emitter configured to transmit a signal to the base according to the charge status, wherein the base further comprises an infrared receiver configured to receive the signal transmitted by the infrared emitter, and wherein the at least one first magnet and the at least one second magnet are positioned so that the infrared emitter is aligned with the infrared receiver when the controller adapter is attached to the base.

* * * * *